(12) United States Patent
Yamaguchi et al.

(10) Patent No.: US 11,206,096 B2
(45) Date of Patent: Dec. 21, 2021

(54) ELECTRONIC CONTROL APPARATUS

(71) Applicant: Mitsubishi Electric Corporation, Tokyo (JP)

(72) Inventors: Takahiro Yamaguchi, Tokyo (JP); Chiaki Fujimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/959,185

(22) PCT Filed: May 10, 2018

(86) PCT No.: PCT/JP2018/018120
§ 371 (c)(1),
(2) Date: Jun. 30, 2020

(87) PCT Pub. No.: WO2019/215871
PCT Pub. Date: Nov. 14, 2019

(65) Prior Publication Data
US 2021/0058182 A1    Feb. 25, 2021

(51) Int. Cl.
*H04J 3/22* (2006.01)
*H04J 3/16* (2006.01)

(52) U.S. Cl.
CPC .  *H04J 3/22* (2013.01); *H04J 3/16* (2013.01)

(58) Field of Classification Search
CPC ........... H04N 21/4305; H04N 21/4344; H04N 21/4348; H04N 21/4347; G06F 11/348; G06F 2201/88; H04J 3/22; H04J 3/16; H04L 49/9057; H04L 2012/5652; H04L 29/06136; H04L 69/166
See application file for complete search history.

(56) References Cited

U.S. PATENT DOCUMENTS

| | | | |
|---|---|---|---|
| 2002/0018492 A1* | 2/2002 | Sakai | H04L 5/1438 370/512 |
| 2003/0035485 A1* | 2/2003 | Honmura | H04N 21/4305 375/240.25 |
| 2007/0157054 A1* | 7/2007 | Frodsham | H04L 1/242 714/704 |

(Continued)

FOREIGN PATENT DOCUMENTS

| | | |
|---|---|---|
| JP | 60-022844 A | 2/1985 |
| JP | H08-102725 A | 4/1996 |

(Continued)

OTHER PUBLICATIONS

International Search Report (PCT/ISA/210) dated Jul. 31, 2018 issued by the International Searching Authority in International Application No. PCT/JP2018/018120.

(Continued)

*Primary Examiner* — Jung Liu
(74) *Attorney, Agent, or Firm* — Sughrue Mion, PLLC; Richard C. Turner

(57) ABSTRACT

Based on a count value held by a transmission counter, an information multiplex apparatus forms multiplexed transmission data by selecting or dividing at least part of each of two or more information items, based on the respective sizes of the two or more information items, a counter period of the transmission counter, and a transmission margin degree.

11 Claims, 7 Drawing Sheets

(56) References Cited

U.S. PATENT DOCUMENTS

2013/0019086 A1* 1/2013 Salapura ............... G06F 11/348
　　　　　　　　　　　　　　　　　　　　　713/1

FOREIGN PATENT DOCUMENTS

| JP | 8-293849 A | 11/1996 |
| JP | 2001-086089 A | 3/2001 |
| JP | 5738445 B2 | 6/2015 |
| JP | 2017-033069 A | 2/2017 |

OTHER PUBLICATIONS

Written Opinion (PCT/ISA/237) dated Jul. 31, 2018 issued by the International Searching Authority in International Application No. PCT/JP2018/018120.
European Search Report dated Apr. 28, 2021 in EP Patent Application No. 18918024.3, 8 pages with translation.
Communication dated Aug. 3, 2021 by the Japanese Patent Office in Application No. 2020-517699 (8 pages with translation).

* cited by examiner

FIG. 4

| SIZE[BYTE] | |
|---|---|
| 0 | INFORMATION A |
| $m^1-1$ | |
| $m^1-1$ | INFORMATION B |
| $m^1+n^1-1$ | |
| $m^1+n^1-1$ | INFORMATION C |
| $m^1+n^1+o^1-1$ | |
| $m^1+n^1+o^1$ | TRANSMISSION COUNTER |
| $m^1+n^1+o^1+1$ | INFORMATION A CRC |
| $m^1+n^1+o^1+2$ | INFORMATION B CRC |
| $m^1+n^1+o^1+3$ | INFORMATION C CRC |
| $m^1+n^1+o^1+4$ | TRANSMISSION COUNTER CRC |

ELECTRONIC CONTROL APPARATUS

TECHNICAL FIELD

The present disclosure relates to an electronic control apparatus in which two or more information items having different reference periods are multiplexed and transmitted.

BACKGROUND ART

In the following explanation, the number of communication lines or the amount of communication data is referred to as a "communication cost"; the fact that the number of communication lines or the amount of communication data increases is described as that "the communication cost becomes disadvantageous"; the fact that the number of communication lines or the amount of communication data decreases is described as that "the communication cost becomes advantageous".

As is well known, in the case where an information output apparatus for outputting communication data (hereinafter, referred to simply as information) having information and a control apparatus for controlling a control subject based on information outputted from the information output apparatus are not synchronized with each other, the timing when the information output apparatus outputs information and the timing when the control apparatus refers to the information transmitted from the information output apparatus are not synchronized with each other; thus, it is required to prevent a period difference between the period in which the information output apparatus transmits information and the control period in the control apparatus. To date, there has been known an electronic control apparatus in which in order to prevent the foregoing period difference, the information output apparatus periodically transmits information in a period earlier than the timing when the control apparatus refers to information.

In general, there has been known an electronic control apparatus in which there is utilized a method of adding data (hereinafter, referred to simply as a transmission counter) that functions as a transmission counter to information to be periodically transmitted. The transmission counter to be added to information is configured as a counter that is counted up by one each time periodic information transmission is completed. In the case where part of periodic information transmission is lost, the control apparatus can detect the fact that part of the information transmission has been lost, based on discontinuity of the transmission counter.

In the case where when the foregoing transmission counter is not added to information, information to be transmitted is the same as previously transmitted information, completely the same information is transmitted; therefore, the control apparatus cannot determine whether the information output apparatus has not updated the information intentionally or information the same as the immediately previous information has erroneously been transmitted. In contrast, in the case where when the foregoing transmission counter is added to information, information to be transmitted is the same as previously transmitted information, the control apparatus can confirm that the information output apparatus has not updated the information intentionally, when the value of a transmission counter added to information previously received by the control apparatus and the value of a transmission counter added to the information received at the present time are different from each other. As described above, the transmission counter added to information to be periodically transmitted has various applications and is utilized in order to raise the reliability of periodic data transmission.

Here, there will be explained a communication method in which no time division multiplexing function is provided and only one signal line is provided. FIG. 2 is an explanatory table representing a communication system in which no time division multiplexing function is provided and only one signal line is provided. In FIG. 2, for example, information A is data of 40 [Byte]; information B is data of 12 [Byte]; information C is data of 4 [Byte]; a transmission counter is data of 1 [Byte]. These information items A, B, and C and the transmission counter, as transmission data 202, are periodically transmitted every 1 [ms] from an information output apparatus to a control apparatus.

As described above, the transmission data 202 is configured with the information items A, B, and C and the transmission counter, and each of the transmission data items 202 has 57 [Byte]. In this situation, because even when the respective update periods of the information items A, B, and C are different from one another, the data of all the information items is transmitted each time, there has been a problem that this transmission method is disadvantageous to the communication cost.

In contrast, to date, there has been known an electronic control apparatus utilizing a time division multiplexing communication system in which in order to solve the foregoing problem, in the case where there exist two or more periods in each of which a control apparatus refers to information, communication lines are divided for each of the periods and then information is periodically transmitted through each of the communication lines or the respective information items are multiplexed and each of the multiplexed information items is transmitted after being provided with selection-signal data indicating the kind of the information.

Here, the method for a typical time division multiplexing communication system will be explained. In the case of a typical time division multiplexing communication system, an information output apparatus, which is a transmitter, divides each of input streams into two or more groups, each of which includes several bytes, and then alternately arranges and transmits those divided groups; a control apparatus, which is a receiver, performs processing reverse to that in the information output apparatus so as to reconfigure each of the streams.

FIG. 7 is an explanatory diagram representing a time division multiplexing communication system. In FIG. 7, information A 102, information B 103, information C 104, and a selection signal are provided, as inputs, to an information multiplex apparatus 106 provided in an information output apparatus. Based on the selection signal, the information multiplex apparatus 106 selects part of or all of the inputted information items A 102, B 103, and C 104 and then outputs the selected information items, as transmission data 200. In this case, because a control apparatus, which is a receiver, needs to recognize the information items included in the transmission data 200 transmitted from the information multiplex apparatus 106, the information multiplex apparatus 106 and the control apparatus need to share information of the selection signal.

A conventional apparatus disclosed in PLT 1 is configured in such a way as to utilize the foregoing time division multiplexing communication system, in such a way as to divide a single selection signal and two or more information data items into at least two data items, in such a way as to add error detection information to each of the divided date items, and in such a way as to transmit the divided data, as a unit, to the control apparatus.

A conventional apparatus disclosed in PLT 2 is configured in such a way that in order to correct a synchronization difference between an information output apparatus and a control apparatus, the information output apparatus outputs information with time information and the control apparatus corrects a calculation period in which based on the time information, information is calculated.

PRIOR ART REFERENCE

Patent Document

[PLT 1] Japanese Patent No. 5738445
[PLT 2] JP 2017-33069A

DISCLOSURE OF THE INVENTION

Problems to be Solved by the Invention

In the case where respective processing intervals for information items are different, an information output apparatus, which is an information transmitter, needs to periodically transmit each of the information items to a control apparatus within the time of a required interval. Meanwhile, in the case where there exist two or more periods for referring to transmitted information, the control apparatus, which is an information receiver, needs to separate communication lines for the respective periods; therefore, the number of communication lines increases in accordance with the kinds of the periods for referring the information.

However, because the number of communication lines through which a microcomputer can be utilized is limited, the information output apparatus cannot transmit periods of respective kinds, the number of which exceeds the number of communication lines on which a microcomputer can be utilized. In that case, it is required to consider multiplexing for transmitting information having a short request interval and information having a long request interval on one and the same communication bus; thus, it is required that there is adopted a transmission method in which a communication band and a CPU (Central Processing Unit) for information processing can efficiently be utilized and in which information transmission can securely be performed within a time required by the control apparatus.

In this case, as described above, a time division multiplexing communication system is widely known; an information output apparatus divides each of input streams into two or more groups, each of which includes several-byte information, and then alternately arranges and transmits those information items; a control apparatus, which is a receiver, performs processing reverse to that in the information output apparatus so as to reconfigure each of the divided streams. The time division multiplexing communication system, in which as described above, one of two or more input information items is selected based on the foregoing selection signal and is outputted, as transmission data, from the information output apparatus, is a typical one. However, as described above, the information output apparatus and the control apparatus need to share the selection signal; in that case, there exists a problem that the information amount of the selection signal to be inputted increases.

The conventional apparatus disclosed in PLT 1 divides a single selection signal and two or more information data items into at least two data items and transmits the divided data item, as a unit, to the control apparatus; however, there has been a problem that as data for the selection signal increases, the communication cost becomes disadvantageous.

The conventional apparatus disclosed in PLT 2 utilizes a calculation method in which a difference between the transmission period and the calculation period is taken into consideration; however, no update of information at a timing required by the control apparatus is assured.

In general, a microcomputer becomes more inexpensive, as the number of communication lines decreases; in addition, a microcomputer becomes more inexpensive, as the processing performance thereof is lower. Because when the communication amount is smaller, the load on the microcomputer for processing communication information decreases, an inexpensive microcomputer having a lower performance can be adopted; when the number of communication lines is smaller, a more inexpensive microcomputer can be adopted.

The present disclosure has been implemented in order to solve the foregoing problems; the objective thereof is to provide an electronic control apparatus that makes the communication cost advantageous and is inexpensive.

Means for Solving the Problems

An electronic control apparatus disclosed in the present disclosure includes
two or more information items to be updated at respective arbitrary timings,
an information multiplex apparatus that multiplexes the two or more information items,
a transmission circuit that periodically transmits multiplexed transmission data outputted by the information multiplex apparatus, and
a transmission counter that counts the number of transmissions by the transmission circuit; the electronic control apparatus is characterized in that based on a count value held by the transmission counter, the information multiplex apparatus forms the multiplexed transmission data by selecting or dividing at least part of each of the two or more information items, based on the respective sizes of the two or more information items, a counter period of the transmission counter, and a transmission margin degree.

Advantage of the Invention

Based on a count value held by a transmission counter, an electronic control apparatus disclosed in the present disclosure forms multiplexed transmission data by selecting or dividing at least part of each of two or more information items, based on the respective sizes of the two or more information items, a counter period of the transmission counter, and a transmission margin degree; therefore, it is made possible to obtain an electronic control apparatus that makes the communication cost advantageous and is inexpensive.

BRIEF DESCRIPTION OF THE DRAWINGS

FIG. 4 is an explanatory table representing transmission data to be transmitted with error detection information added thereto, in the electronic control apparatus according to Embodiment 1;

BEST MODE FOR CARRYING OUT THE INVENTION

Embodiment 1

Figure 1:
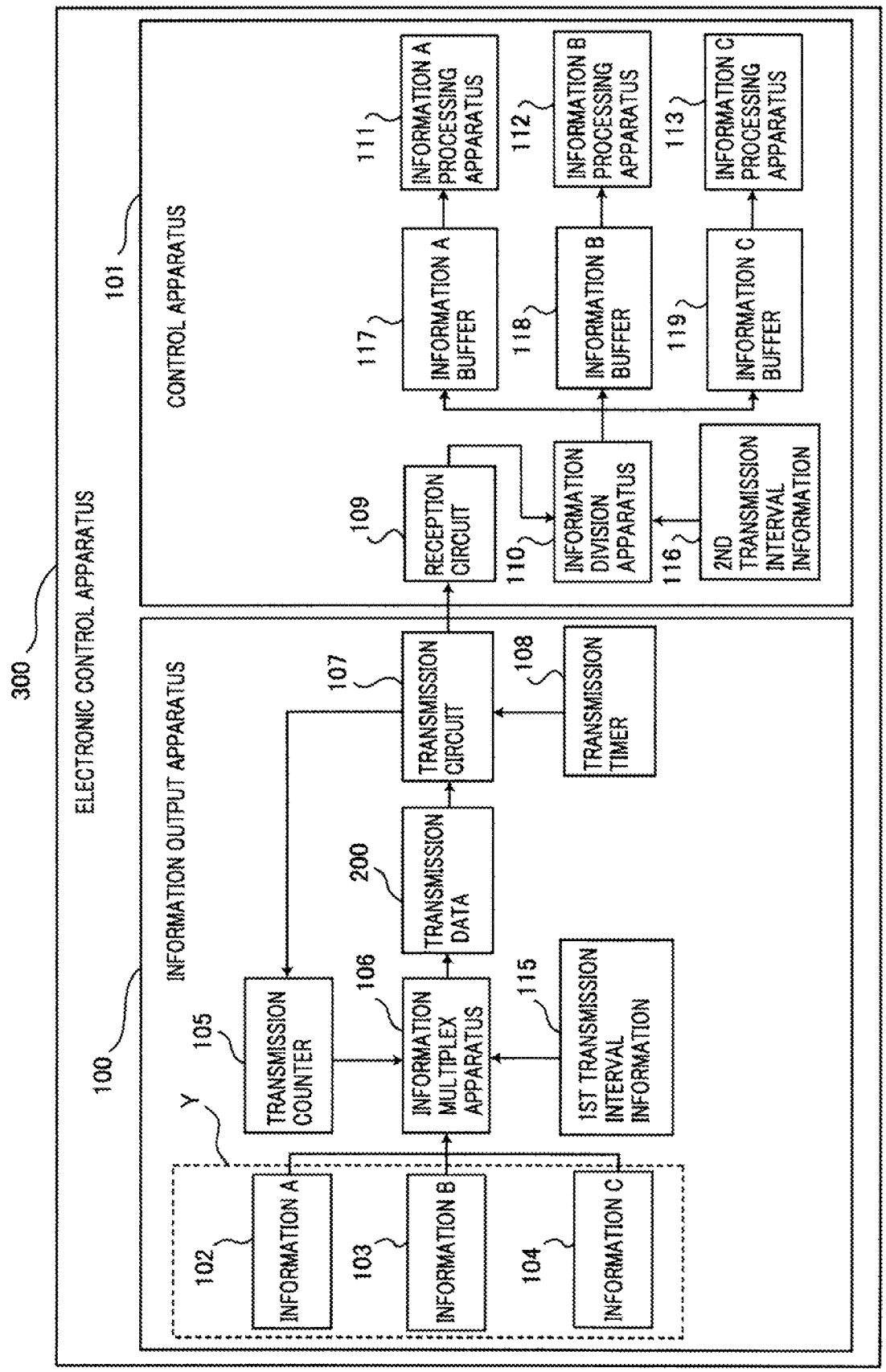
FIG. 1 is a functional block diagram representing the configuration of an electronic control apparatus according to Embodiment 1.

Hereinafter, an electronic control apparatus according to Embodiment 1 will be explained with reference to the drawings. In each of the drawings, the same or similar constituent elements will be explained with the same reference numerals assigned thereto. FIG. 1 is a block diagram representing the configuration of an electronic control apparatus according to Embodiment 1. In FIG. 1, an electronic control apparatus 300 is provided with an information output apparatus 100 that outputs information and a control apparatus 101 that controls a control subject, based on the information outputted from the information output apparatus 100. The information output apparatus 100 and the control apparatus 101 have respective separate microcomputers; each of the information output apparatus 100 and the control apparatus 101 is configured in such a way as to operate based on its own microcomputer; the information output apparatus 100 and the control apparatus 101 operate in non-synchronization with each other.

Information Y provided in the information output apparatus 100 includes information A 102, information B 103, and information C 104. The information A 102, the information B 103, and the information C 104 are updated at respective different timings and are constantly inputted to an information multiplex apparatus 106. A transmission timer 108 for outputting a transmission request signal to a transmission circuit 107 is disposed in the information output apparatus 100. The transmission timer 108 outputs the transmission request signal to the transmission circuit 107 every specific time. At a timing when the transmission request signal is inputted thereto from the transmission timer 108, the transmission circuit 107 outputs transmission data 200, which is outputted from the information multiplex apparatus 106, to the control apparatus 101.

After transmitting the transmission data 200 from the information multiplex apparatus 106 to a reception circuit 109, the transmission circuit 107 inputs a transmission completion signal to a transmission counter 105. At a timing when the transmission completion signal is inputted thereto from the transmission circuit 107, the transmission counter 105 adds "1" to a count value that has been held therein. In general, as far as the count value held in the transmission counter 105 is concerned, overflow is not taken into consideration. Based on a count value held in the transmission counter 105 and a first transmission interval information 115, the information multiplex apparatus 106 selects one of or two or more of the information A 102, the information B 103, and the information C 104 to be transmitted and outputs the selected information items to be transmitted, as the transmission data 200, to the transmission circuit 107.

The control apparatus 101 is provided with the reception circuit 109 that receives the transmission data 200 transmitted from the transmission circuit 107, an information division apparatus 110 that divides reception data received by the reception circuit 109 into one of or all of the information A 102, the information B 103, and the information C 104, based on a second transmission interval information 116, an information A buffer 117 that holds the information A divided by the information division apparatus 110, an information B buffer 118 that holds the information B divided by the information division apparatus 110, and an information C buffer 119 that holds the information C divided by the information division apparatus 110.

The control apparatus 101 is further provided with an information A processing apparatus 111 that performs predetermined processing, based on the information A extracted from the information A buffer 117, an information B processing apparatus 112 that performs predetermined processing, based on the information B extracted from the information B buffer 118, and an information C processing apparatus 113 that performs predetermined processing, based on the information C extracted from the information C buffer 119.

The information A processing apparatus 111, the information B processing apparatus 112, and the information C processing apparatus 113 perform in respective different periods.

The information A, from the information division apparatus 110, that has been held in the information A buffer 117 needs to be updated before the foregoing information A processing apparatus 111 performs predetermined processing. Similarly, the information B, from the information division apparatus 110, that has been held in the information B buffer 118 needs to be updated before the information B processing apparatus 112 performs predetermined processing. Further similarly, the information C, from the information division apparatus 110, that has been held in the information C buffer 119 needs to be updated before the information C processing apparatus 113 performs predetermined processing.

In general, in the case where respective data amounts required by the information A processing apparatus 111, the information B processing apparatus 112, and the information C processing apparatus 113 are large, large amount of data can be transmitted by raising the communication speed of the transmission circuit 107.

In the case where the period in which the information A processing apparatus 111 obtains the information A from the information A buffer 117 is short, the output period of the transmission timer 108 that outputs the transmission request signal is shortened thereby shortening the update period of the information A in the information A buffer 117, so that it is made possible to cope with the period in which the information A processing apparatus 111 obtains the information A from the information A buffer 117.

In the case where the period in which the information B processing apparatus 112 obtains the information B from the information B buffer 118 is short, the output period of the transmission timer 108 that outputs the transmission request signal is shortened thereby shortening the update period of the information B in the information B buffer 118, so that it is made possible to cope with the period in which the information B processing apparatus 112 obtains the information B from the information B buffer 118.

Furthermore, in the case where the period in which the information C processing apparatus 113 obtains the information C from the information C buffer 119 is short, the output period of the transmission timer 108 that outputs the transmission request signal is shortened thereby shortening the update period of the information C in the information C buffer 119, so that it is made possible to cope with the period in which the information C processing apparatus 113 obtains the information C from the information C buffer 119.

However, in the case where it is required to select a microcomputer in which the load to be imposed thereon is reduced so as to suppress the cost, it is required that the output period of the transmission timer 108 that outputs the transmission request signal is set to be as long as possible. In addition, the limitations of the communication speed of the transmission circuit 107 depends on the performance of the microcomputer, the electric characteristics of the communication path, and the like.

Here, an information processing method, which is generally known, will be explained. For example, it is assumed that processing of the information A is performed in a period of 8 [ms], processing of the information B is performed in a period of 4 [ms], and processing of the information C is performed in a period of 2 [ms]. The respective information items to be processed by the information A processing apparatus 111, the information B processing apparatus 112, and the information C processing apparatus 113 are held in the information output apparatus 100. In this case, it is required that the information items to be outputted from the information output apparatus 100, i.e., the information A, the information B, and the information C are updated within 8 [ms], 4 [ms], and 2 [ms], respectively; however, information data cannot be transmitted at a speed exceeding the communication-speed limitation of the transmission circuit 107.

Moreover, it is required that before the information A processing apparatus 111, the information B processing apparatus 112, and the information C processing apparatus 113 obtain the respective information items, the transmission circuit 107 completes transmission of each of the respective information items. The reason for the above is that when the transmission circuit 107 cannot transmit the updated information A 102, information B 103, information C 104 within the respective processing periods of the information A processing apparatus 111, the information B processing apparatus 112, and the information C processing apparatus 113, a period difference between the information output apparatus 100 and the control apparatus 101 occurs and hence the microcomputer in the control apparatus 101 cannot appropriately perform control calculation.

In this situation, for the purpose that the transmission circuit 107 completes transmission of the respective information items before the information A processing apparatus 111, the information B processing apparatus 112, and the information C processing apparatus 113 obtain respective information items, it is required that the output period of the transmission timer 108 that outputs the transmission request signal is shorter than the shortest processing period among the respective processing periods of the information A processing apparatus 111, the information B processing apparatus 112, and the information C processing apparatus 113. However, when the output period of the transmission timer 108 that outputs the transmission request signal becomes shorter, the processing load on the microcomputer becomes larger. Accordingly, as the output period of the transmission timer 108, there is selected a period obtained by considering "a minimally necessary margin" for the shortest processing period among the respective processing periods of the information A processing apparatus 111, the information B processing apparatus 112, and the information C processing apparatus 113.

Because depending on the configuration of the system, the foregoing "minimally necessary margin" cannot unconditionally be defined. For example, the resolution of the transmission timer 108, variations in the respective clocks and the like provided in two or more devices that operate in non-synchronization with one another, the load on the CPU, which is allowable in the system, a processing delay in the CPU, and the like may be the factors to be considered when the "minimally necessary margin" is defined.

Next, the information multiplex apparatus 106 according to Embodiment 1 will be explained in detail. There are preliminarily defined an output period Ts of the transmission timer 108 that outputs the transmission request signal to the transmission circuit 107, the respective processing periods in which the information A processing apparatus 111, the information B processing apparatus 112, and the information C processing apparatus 113 perform processing items, the size of information to be transmitted by the information output apparatus 100, and the margin degree for absorbing variations in the respective clocks and operation timings of the constituent elements in the information output apparatus 100 and the control apparatus 101; based on these preliminarily defined information items, a counter period A, a counter period B, a counter period C, and the size of information to be transmitted through a single transmission are calculated though after-mentioned calculation equations and are preliminarily provided to the information multiplex apparatus 106.

Here, the counter period A denotes a period in which to the information multiplex apparatus 106, the transmission counter 105 outputs a timing signal for outputting the information A; the counter period B denotes a period in which to the information multiplex apparatus 106, the transmission counter 105 outputs a timing signal for outputting the information B; the counter period C denotes a period in which to the information multiplex apparatus 106, the transmission counter 105 outputs a timing signal for outputting the information C.

The information multiplex apparatus 106 is configured in such a way as to output the information A when receiving, from the transmission counter 105, the timing signal for outputting the information A, in such a way as to output the information B when receiving the timing signal for outputting the information B, and in such a way as to output the information C when receiving the timing signal for outputting the information C.

Here, letting "processing period A", "processing period B", "processing period C", and "ω" (0<ω<1) denote the processing period of the information A processing apparatus 111, the processing period of the information B processing apparatus 112, the processing period of the information C processing apparatus 113, and the margin degree for absorbing variations in the respective clocks and operation timings of the constituent elements in the information output apparatus 100 and the control apparatus 101, respectively, the counter period A, the counter period B, and the counter period C to be provided to the information multiplex apparatus 106 need to satisfy the following equations (1), (2), and (3), respectively. In this regard, however, "ROUNDDOWN"

denotes rounding down the digits after the decimal point. The foregoing margin degree is a transmission margin degree.

$$1 \leq \text{counter period } A \leq \text{ROUNDDOWN}[1/\{Ts/(\text{processing period } A*\omega)\}] \quad (1)$$

$$1 \leq \text{counter period } B \leq \text{ROUNDDOWN}[1/\{Ts/(\text{processing period } B*\omega)\}] \quad (2)$$

$$1 \leq \text{counter period } C \leq \text{ROUNDDOWN}[1/\{Ts/(\text{processing period } C*\omega)\}] \quad (3)$$

The size $m^1$ of the information A to be transmitted through a single transmission from the transmission circuit 107, the size $n^1$ of the information B to be transmitted through a single transmission from the transmission circuit 107, and the size $o^1$ of the information C to be transmitted through a single transmission from the transmission circuit 107 are preliminarily defined by the following equations (4), (5), and (6) and are provided to the information multiplex apparatus 106. In this regard, however, "ROUNDUP" denotes rounding up the digit at the first decimal place. Here, m, n, and o denotes the full size of the information A, the full size of the information B, and the full size of the information C, respectively. Here, the unit [Byte] for each of the sizes is omitted.

$$m \geq m^1 \geq \text{ROUNDUP}[m/\text{counter period } A] \quad (4)$$

$$n \geq n^1 \geq \text{ROUNDUP}[n/\text{counter period } B] \quad (5)$$

$$o \geq o^1 \geq \text{ROUNDUP}[o/\text{counter period } C] \quad (6)$$

The counter period A, the counter period B, the counter period C, the size $m^1$ of the information A to be transmitted through a single transmission, the size $n^1$ of the information B to be transmitted through a single transmission, and the size $o^1$ of the information C to be transmitted through a single transmission are respective integers and need to satisfy the respective conditions in the corresponding equations (1), (2), (3), (4), (5), and (6).

Here, it is assumed that cnt denotes the present count value held in the transmission counter 105; based on the following equations (7), (8), and (9), the information multiplex apparatus 106 constantly calculates information items corresponding to the present count value cntA for the information A, the present count value cntB for the information B, and the present count value cntC for the information C. In this regard, however, mod denotes each of the "remainder" of a division[m/counter period A], the "remainder" of a division[n/counter period B], and the "remainder" of a division[o/counter period C].

$$cntA = cnt \bmod \text{counter period } A \quad (7)$$

$$cntB = cnt \bmod \text{counter period } B \quad (8)$$

$$cntC = cnt \bmod \text{counter period } C \quad (9)$$

In addition, it is assumed that the present count value cnt held in the transmission counter 105 is increased by "1" for each transmission and returns to "0" when reaching an overflow.

The information multiplex apparatus 106 produces data, based on the foregoing information. Specifically, from the transmission sizes $m^1$, $n^1$, and $o^1$ and the present count values cntA, cntB, and cntC of the transmission counter 105, the information multiplex apparatus 106 produces information A transmission data expressed by the equation (10) below, information B transmission data expressed by the equation (11) below, and information C transmission data expressed by the equation (12) below.

$$\text{information } A \text{ transmission data} = \text{data items from information } A[m^2*cntA] \text{ to information } A[m^1*cntA+m^1-1] \quad (10)$$

$$\text{information } B \text{ transmission data} = \text{data items from information } B[n^1*cntB] \text{ to information } B[n^1*cntB+n^1-1] \quad (11)$$

$$\text{information } C \text{ transmission data} = \text{data items from information } C[o^1*cntC] \text{ to information } C[o^1*cntC+o^1-1] \quad (12)$$

The information multiplex apparatus 106 provides, to the transmission circuit 107, the foregoing information A transmission data, information B transmission data, and information C transmission data, as the transmission data 200. In response to the transmission request signal from the transmission timer 108, the transmission circuit 107 outputs the transmission data 200 including the information A transmission data, the information B transmission data, and the information C transmission data. Each time the transmission circuit 107 outputs the transmission data 200, the transmission counter 105 receives the transmission completion signal from the transmission circuit 107 and then increases the count value by "1".

Figure 3:
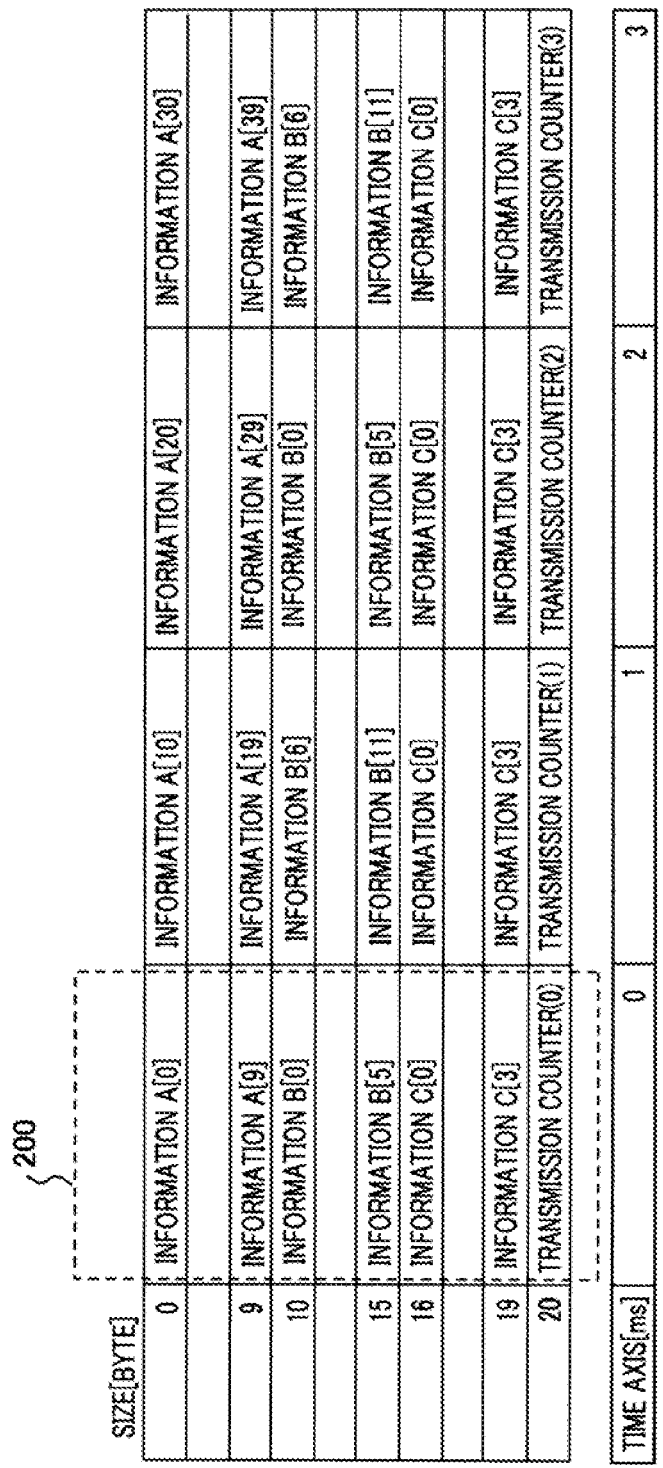
FIG. 3 is an explanatory table representing an example of transmission data in the electronic control apparatus according to Embodiment 1.

As represented in foregoing FIG. 3, because even when two or more information items are divided, data of a fixed size can periodically be transmitted, assurance of communication band and assurance of a communication timing and the like can readily be realized. Because instead of a selection signal required by a conventional apparatus, a count value held in the transmission counter 105 is utilized, the transmission data 200 has a data structure including only information and a counter value and has no time information; therefore, the communication amount for transmitting the transmission data 200 is a minimally necessary amount and hence the communication cost can be suppressed. As described above, because instead of a selection signal required by a conventional apparatus, a count value held of the transmission counter 105 is utilized, no extra selection control input is required and hence Embodiment 1 is advantageous to the communication cost.

The reception circuit 109 in the control apparatus 101 transfers reception data received from the transmission circuit 107 to the information division apparatus 110. Based on the second transmission interval information 116, the information division apparatus 110 divides the reception data and stores data of the information A, date of the information B, and data of the information C in the information A buffer 117, the information B buffer 118, and the information C buffer 119, respectively.

Figure 5:
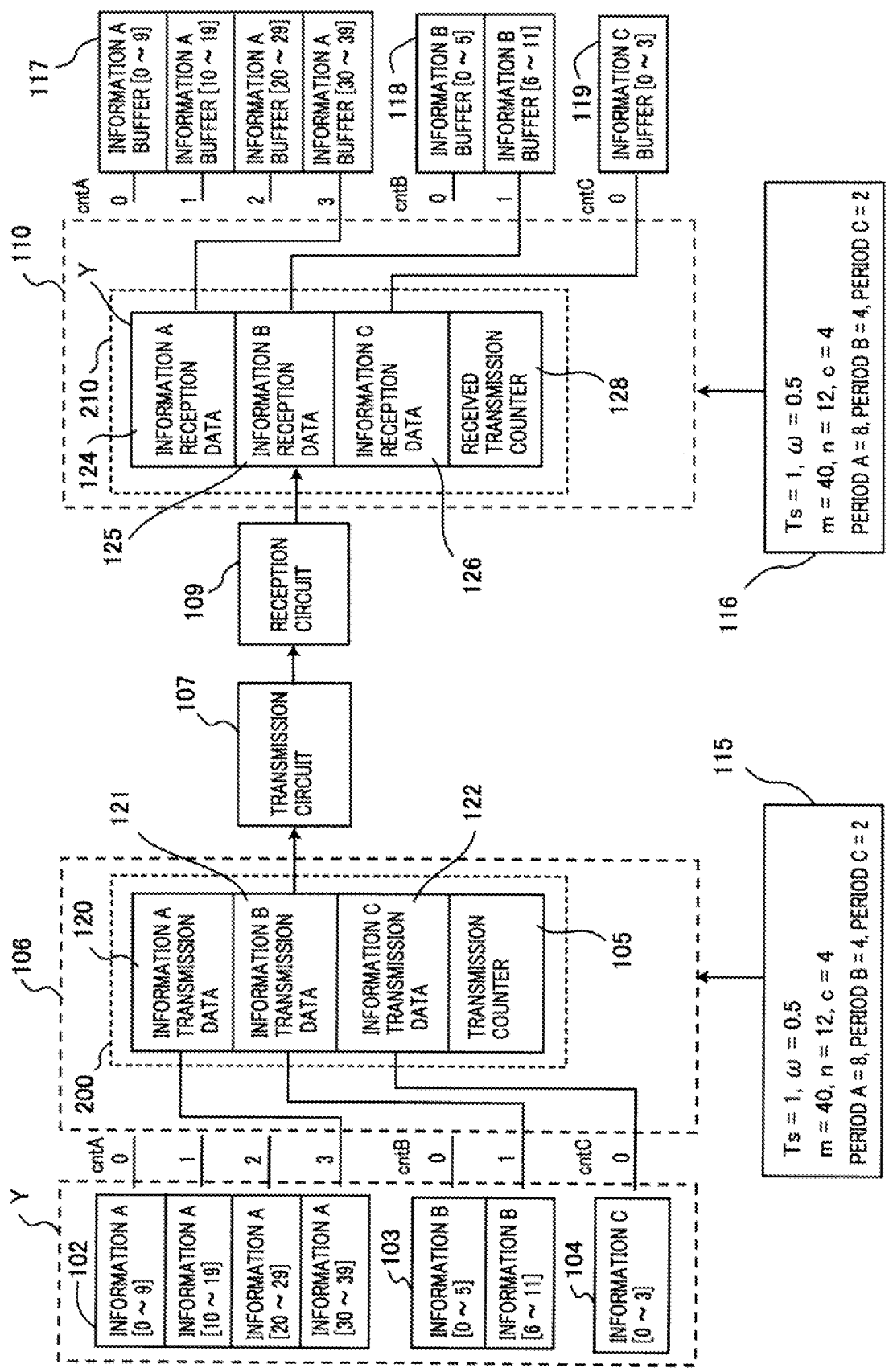
FIG. 5 is a functional block diagram representing the operation of the electronic control apparatus according to Embodiment 1.

FIG. 5 is a block diagram representing the operation of the electronic control apparatus according to Embodiment 1. In FIG. 5, as described in FIG. 1, the information Y includes the information A 102, the information B 103, and the information C 104. The information A includes information A[0~9], information A[10~19], information A[20~29], and information A[30~39]. The information B includes information B[0~5] and information B[6~11]. The information C includes information C[0~3]. The information multiplex apparatus 106 is represented in such a way as to include the transmission data 200 in FIG. 1.

In this situation, for example, the conditions are given as follows:

the output period Ts of the transmission timer 108 is 1 [ms] (Ts=1 [ms]), the margin degree ω for absorbing variations in the respective clocks and operation timings of the constituent elements in the information output apparatus 100 and the control apparatus 101 is 0.5 (ω=0.5), the full size m of the information A is 40 [Byte] (m=40 [Byte]), the full size n of the information B is 12 [Byte] (n=12 [Byte]), the full size o of the information C is 4 [Byte] (o=4 [Byte]), the processing period A of the information A processing apparatus 111 is 8 [ms] (processing period A=8 [ms]), the processing period B of the information B processing apparatus 112 is 4 [ms] (processing period B=4 [ms]), and the processing period C of the information C processing apparatus 113 is 2 [ms] (processing period C=2 [ms]).

The respective operational actions of the information multiplex apparatus 106 and the information division apparatus 110 under the foregoing conditions are represented in FIG. 5.

Under the foregoing conditions, the counter period A is 4 [ms] from the foregoing equation (1) (counter period A=4 [ms]); the counter period B is 2 [ms] from the foregoing equation (2) (counter period B=2 [ms]); the counter period C is 1 [ms] from the foregoing equation (3) (counter period C=1 [ms]).

Thus, from the foregoing equation (4), it is preliminarily defined that the size $m^1$ of the information A to be transmitted through a single transmission from the transmission circuit 107 is 10 [Byte] ($m^1$=10); from the foregoing equation (5), it is preliminarily defined that the size $n^1$ of the information B to be transmitted through a single transmission from the transmission circuit 107 is 6 [Byte] ($n^1$=6); from the foregoing equation (6), it is preliminarily defined that the size $o^1$ of the information C to be transmitted through a single transmission from the transmission circuit 107 is 4 [Byte] ($o^1$=4).

The preliminarily defined size $m^1$ of the information A to be transmitted through a single transmission, the preliminarily defined size $n^1$ of the information B to be transmitted through a single transmission, and the preliminarily defined size $o^1$ of the information C to be transmitted through a single transmission are preliminarily provided to the first transmission interval information 115 and are further provided to the information multiplex apparatus 106 from the first transmission interval information 115.

Similarly, the preliminarily defined size $m^1$ of the information A to be transmitted through a single transmission, the preliminarily defined size $n^1$ of the information B to be transmitted through a single transmission, and the preliminarily defined size $o^1$ of the information C to be transmitted through a single transmission are preliminarily provided to the second transmission interval information 116 and are further provided to the information division apparatus 110 from the second transmission interval information 116.

Here, the method of forming the information A 102 into the information A transmission data 120 will be explained. Because as described above, the counter period A=4, the count value cntA of the transmission counter 105 repeats the numeral sequence [0, 1, 2, 3], as represented in FIG. 5. In accordance with these count values, data corresponding to the size $m^1$ to be transmitted through a single transmission from the transmission circuit 107 is extracted from the data items in the information A 102. In such a manner as described above, the information A transmission data 120 is formed with the data corresponding to the size $m^1$, extracted from the information A 102 for each of the count values "0", "1", "2", and "3" of the transmission counter 105. The information A transmission data 120 includes data items from information $A[m^1*cntA]$ to information $A[m^1*cntA+m^1-1]$, as represented by the foregoing equation (10).

Next, the method of forming the information B 103 into the information B transmission data 121 will be explained. Because as described above, the counter period B=2, the count value cntB of the transmission counter 105 repeats the numeral sequence [0, 1], as represented in FIG. 5. In accordance with these count values, data corresponding to the size $n^1$ to be transmitted through a single transmission from the transmission circuit 107 is extracted from the data items in the information B 103. In such a manner as described above, the information B transmission data 121 is formed with the data corresponding to the size $n^1$, extracted from the information B 103 for each of the count values "0" and "1" of the transmission counter 105. The information B transmission data 121 includes data items from information $B[n^1*cntB]$ to information $B[n^1*cntB+n^1-1]$, as represented by the foregoing equation (11).

Furthermore, the method of forming the information C 104 into the information C transmission data 122 will be explained. Because as described above, the counter period C=1, the count value cntC of the transmission counter 105 repeats[0], as represented in FIG. 5. In accordance with the count value, data corresponding to the size $o^1$ to be transmitted through a single transmission from the transmission circuit 107 is extracted from the data items in the information C 104. In such a manner as described above, the information C transmission data 122 is formed with the data corresponding to the size $o^1$, extracted from the information C 104 for each of the count values "0" of the transmission counter 105. The information C transmission data 122 includes data items from information $C[o^1*cntC]$ to information $C[o^1*cntC+o^1-1]$, as represented by the foregoing equation (12).

The transmission data 200 formed of the information A transmission data 120 including the count value cntA of the transmission counter 105, the information B transmission data 121 including the count value cntB of the transmission counter 105, and the information C transmission data 122 including the count value cntC of the transmission counter 105 is transmitted by way of the transmission circuit 107 to the reception circuit 109 in the control apparatus 101.

Based on the information from the second transmission interval information 116, the information division apparatus 110 forms reception data 210 the same as the transmission data 200 received by the reception circuit 109. The reception data 210 is configured with information A reception data 124, information B reception data 125, information C reception data 126, and a received transmission counter 128. That is to say, the information division apparatus 110 calculates the count values cntA, cntB, and cntC from the received transmission counter 128 and arranges data items in the information A buffer 117, the information B buffer 118, and the information C buffer 119, based on the following equations (13), (14), and (15).

$$\text{data items from information } A \text{ buffer}[m^1*cntA] \text{ to} \\ \text{information } A \text{ buffer}[m^1*cntA+m^1-1]=\text{information } A \text{ reception data} \quad (13)$$

$$\text{data items from information } B \text{ buffer}[n^1*cntB] \text{ to} \\ \text{information } B \text{ buffer}[n^1*cntB+n^1-1]=\text{information } B \text{ reception data} \quad (14)$$

$$\text{data items from information } C \text{ buffer}[o^1*cntC] \text{ to} \\ \text{information } C \text{ buffer}[o^1*cntC+o^1-1]=\text{information } C \text{ reception data} \quad (15)$$

That is to say, because as described above, the counter period A is 4, data corresponding to the size $m^1$ is extracted from the information A reception data 124 in accordance with "0", "1", "2", and "3", as the count values cntA of the received transmission counter 128; then, the data is divided into the data items from information $A[m^1*cntA]$ to information $A[m^1*cntA+m^1-1]$, as represented by the foregoing equation (13). These respective data items obtained through the division of the information A reception data 124 are arranged in an information A buffer[0~9], an information A buffer[10~19], an information A buffer[20~29], and information A buffer[30~39].

Moreover, because as described above, the counter period B is 2, data corresponding to the size $n^1$ is extracted from the information B reception data 125 in accordance with "0" and "1", as the count values cntB of the received transmission counter 128; then, the data is divided into the data items from information $B[n^1*cntB]$ to information $B[n^1*cntA+n^1-1]$, as represented by the foregoing equation (14). These respective data items obtained through the division of the information B reception data 125 are arranged in an information B buffer[0~5] and an information B buffer[6~11].

Furthermore, because as described above, the counter period C is 1, data corresponding to the size $o^1$ is extracted from the information C reception data 126 in accordance with "0", as the count value cntC of the received transmission counter 128; then, the data is divided into the data items from information $C[o^1*cntC]$ to information $C[o^1*cntA+n^1-1]$, as represented by the foregoing equation (15). These respective data items obtained through the division of the information C reception data 126 are arranged in an information C buffer[0~5].

As described above, the margin degree ω for absorbing variations in the respective clocks and operation timings of the constituent elements in the information output apparatus 100 and the control apparatus 101 is set to 0.5 (ω=0.5); therefore, while each of the information A processing apparatus 111, the information B processing apparatus 112, and the information C processing apparatus 113 is periodically activated, data is updated substantially twice. When the margin degree ω, as a coefficient, is increased, the respective update periods of the information A buffer 117, the information B buffer 118, and the information C buffer 119 becomes longer and hence the amount of single communication decreases. In contrast, when the margin degree ω is decreased, the respective update periods of the information A buffer 117, the information B buffer 118, and the information C buffer 119 becomes shorter and hence the amount of single communication increases.

In the case where the margin degree ω is "1", the timing at which the information A processing apparatus 111, the information B processing apparatus 112, and the information C processing apparatus 113 are activated is the same as the timing at which the information A buffer 117, the information B buffer 118, and the information C buffer 119 are activated; however, as described above, the information output apparatus 100 and the control apparatus 101 are operated with respective different clocks and hence the operational actions thereof are not in synchronization with each other. Thus, there is a probability that in the case where the margin degree ω is "1", the information A buffer 117, the information B buffer 118, and the information C buffer 119 have not been updated at the timing at which the information A processing apparatus 111, the information B processing apparatus 112, and the information C processing apparatus 113 obtain the information A buffer 117, the information B buffer 118, and the information C buffer 119, respectively.

In the electronic control apparatus according to Embodiment 1, in order to solve the defect at a time when the information output apparatus 100 and the control apparatus 101 operate in non-synchronization with each other, the margin degree ω is set, for example, in such a way as to satisfy the equation (16) below.

ω≤(the minimum value of variation in the operational clock of the information output apparatus 100/the maximum value of variation in the operational clock of the control apparatus 101) (16)

Although in the above explanation, the margin degree ω has been set based on the variation in the clock, the optimal value of the margin degree co differs depending on the system; for example, in some cases, it is required to consider a processing delay in the CPU and the like.

Figure 2:
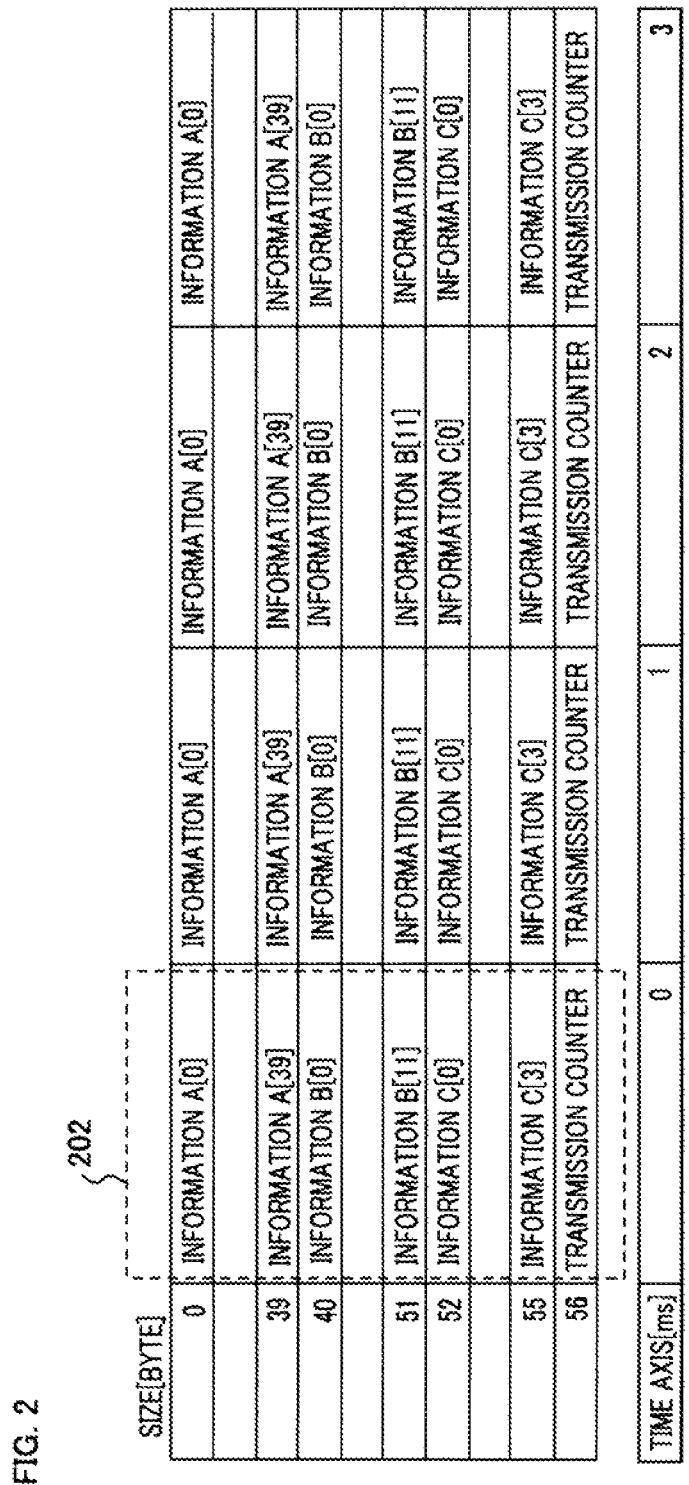
FIG. 2 is an explanatory table representing a communication system in which no time division multiplexing function is provided and only one signal line is provided.

In the electronic control apparatus according to Embodiment 1, described above, the data represented in FIG. 3 is finally transmitted. That is to say, FIG. 3 is an explanatory table representing an example of transmission data in the electronic control apparatus according to Embodiment 1. It can be understood that although in the example in foregoing FIG. 2 that represents a communication system where no function for time division multiplexing communication is provided and only a single signal line is provided, it is required to transmit data, as the transmission data 202, of 57 [Byte] per 1[ms], the electronic control apparatus according to Embodiment 1 makes it possible to form data, as the transmission data 200, of 21 [Byte] per 1 [ms] and is advantageous to the communication cost.

In this regard, however, it is required to confirm that in the end, the information amount of the transmission data 200 does not exceed the transmission band between the transmission circuit 107 and the reception circuit 109. In this situation, provided the information amount of the transmission data 200 exceeds the foregoing transmission band, there are performed adjustment in which the size $m^1$ of the information A to be transmitted through a single transmission, the size $n^1$ of the information B to be transmitted through a single transmission, and the size $o^1$ of the information C to be transmitted through a single transmission are reduced within the conditions in the foregoing equations (10), (11), and (12), respectively, or in which the counter period A, the counter period B, and the counter period C are prolonged, so that the information amount of the transmission data 200 for a single transmission can be adjusted not to exceed the communication band.

As described above, in the electronic control apparatus according to Embodiment 1, the output period Ts of the transmission timer 108 and the communication speed of the transmission circuit 107 can be set while considering the information amount (data size), the counter period A, the counter period B, the counter period C, and the foregoing margin degree ω, as a transmission margin degree.

Provided the information amount of the transmission data 200 does not exceed the foregoing transmission band, the margin degree ω is lowered (decreased), the counter period is shortened (reduced), or the size $m^1$ of the information A to be transmitted through a single transmission, the size $n^1$ of the information B to be transmitted through a single transmission, and the size $o^1$ of the information C to be transmitted through a single transmission are increased (enlarged), so that the redundancy of the transmission data can be raised.

Figure 6:
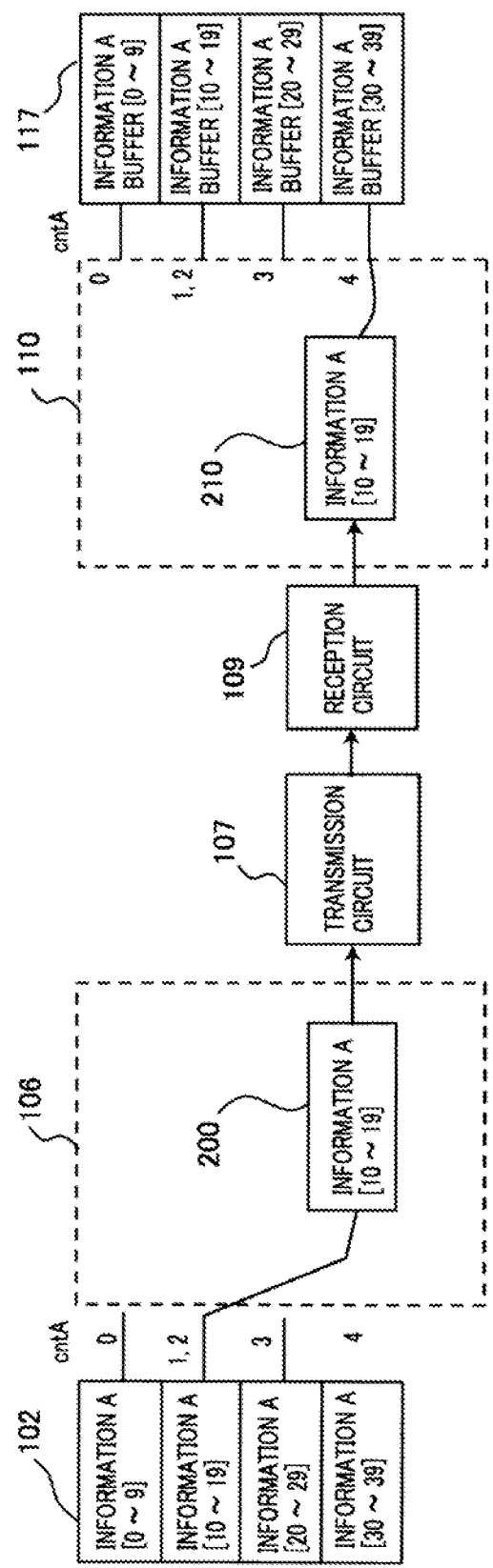
FIG. 6 is a functional block diagram representing the operation of the electronic control apparatus according to Embodiment 1.
Figure 7:
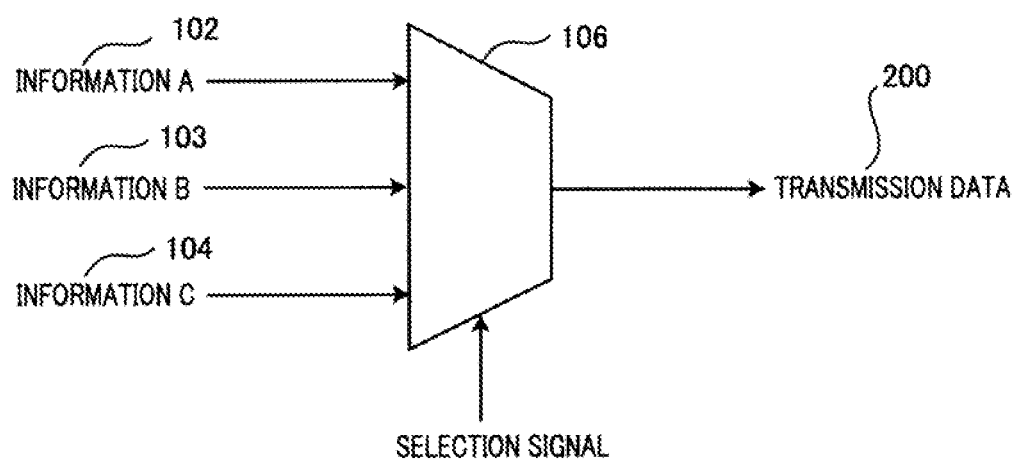
FIG. 7 is an explanatory diagram representing a time division multiplexing communication system.

Here, the redundancy of data will be explained. In the case where there exists information, among information items to be transmitted, that has high priority and in which erroneous loss should be suppressed, the frequency of sending the high-priority data is raised so as to raise the redundancy, so that the solidity for the communication error can be raised. The redundancy of data will specifically be explained by use of FIG. 6. FIG. 6 is a block diagram representing the operation of the electronic control apparatus according to Embodiment 1 and represents an example in which part of the information A 102 is made to have redundancy.

In FIG. 6, in the case where in order to prevent even a single communication error from providing an effect to the system, the information A[10~19], for example, is made to have redundancy, the size of the information A 102 is defined as [$m^{11}$=m+4] because the size of the original information A 102 is [m=40] and transmission information corresponding to 4 [Byte] increases; the counter period A increases by "1" and is defined as [counter period A=5]. As represented in FIG. 6, as the count values cntA of the transmission counter 105, "1" and "2" are allocated to the information A[10~19]. In other words, as represented in FIG. 6, when the count value cntA of the transmission counter 105 is any one of "1" and "2", the information A[10~19] is redundantly transmitted to the information division apparatus 110.

When the count value cntA of the transmission counter 105 is "0", the information A[0~9] is transmitted to the information division apparatus 110; when the count value cntA of the transmission counter 105 is "3", the information A[20~29] is transmitted to the information division apparatus 110; when the count value cntA of the transmission counter 105 is "4", the information A[30~39] is transmitted to the information division apparatus 110.

After calculating the count value cntA of the received transmission counter 128, the information division apparatus 110 arranges data items from [$m^1$*cntA] to [$m^1$*cntA+$m^1$−1], as the information A reception data in the reception data 210, in the information A buffer 117, based on the foregoing equation (13).

That is to say, when the count value cntA of the received transmission counter 128 is "0", the information A[0~9] is disposed in the information A buffer[0~9]; when the count value cntA is any one of "1" an "2", the information A[10~19] is disposed in the information A buffer[10~19]; when the count value cntA is "3", the information A[20~29] is disposed in the information A buffer [20~29]; when the count value cntA is "4", the information A[30~39] is disposed in the information A buffer[30~39].

As described above, when redundant data is transmitted, the communication amount increases; however, it is only necessary to confirm that in the end, the information amount does not exceed the transmission band between the transmission circuit 107 and the reception circuit 109. In this situation, provided the amount of information to be transmitted exceeds the transmission band between the transmission circuit 107 and the reception circuit 109, there are performed adjustment in which the size $m^1$ of the information A to be transmitted through a single transmission, the size $n^1$ of the information B to be transmitted through a single transmission, and the size $o^1$ of the information C to be transmitted through a single transmission are reduced within the conditions in the foregoing equations (10), (11), and (12), respectively, or in which the counter period A, the counter period B, and the counter period C are prolonged, so that the information amount of the transmission data 200 for a single transmission can be adjusted not to exceed the communication band.

FIG. 4 is an explanatory table representing transmission data to be transmitted with error detection information added thereto, in the electronic control apparatus according to Embodiment 1. As represented in FIG. 4, in order to raise the reliability of each of data items, error detection information CRC, for example, is added to each of information items and then the information item is transmitted, so that while removing only the information item including an error, the information division apparatus 110 can form data for the information A, data for the information B, and data for the information C in the information A buffer 117, the information B buffer 118, and the information C buffer 119, respectively.

Because even when information including an error is removed from the transmission data, respective previous data items are remaining in the information A buffer 117, the information B buffer 118, and the information C buffer 119, the information A processing apparatus 111, the information B processing apparatus 112, and the information C processing apparatus 113 can continue to perform processing, by holding and directly utilizing these previous data items; however, when information items including an error continue one after another, processing advances while previous information items are not updated; therefore, when information items including an error are detected in a considerably successive manner, the control apparatus 101 may perform some sort of error processing.

As represented in FIG. 4, the size of information required for a single transmission increases by 5 [Byte], as expressed by [$m^1$+$n^1$+$o^1$+5]; however, it is only necessary to confirm that in the end, the information amount does not exceed the transmission band between the transmission circuit 107 and the reception circuit 109. In this situation, provided the size of information required for a single transmission exceeds the transmission band between the transmission circuit 107 and the reception circuit 109, there are performed adjustment in which the size $m^1$ of the information A to be transmitted through a single transmission, the size $n^1$ of the information B to be transmitted through a single transmission, and the size $o^1$ of the information C to be transmitted through a single transmission are reduced within the conditions in the foregoing equations (10), (11), and (12), respectively, or in which the counter period A, the counter period B, and the counter period C are prolonged, so that the transmission size for a single transmission can not only be reduced but also be adjusted not to exceed the foregoing communication band. As described above, the output period of the transmission timer 108 and the communication speed of the transmission circuit 107 can be set while considering the size, the period, and the margin degree of the transmission.

In the foregoing electronic control apparatus according to Embodiment 1, three information items, i.e., the information A, the information B, and the information Care utilized; however, the number of information items is not limited to three, and the system may have two or more information items.

Each of the information A 102, the information B 103, and the information C 104 may be either a sensor detection value to be inputted from a sensor or the like (unillustrated) provided, for example, outside or inside the electronic control apparatus 300 or a calculation result calculated in the electronic control apparatus 300.

Furthermore, the information output apparatus 100 can determine the update timing of each of the information A 102, the information B 103, and the information C 104 and can determine selection and division of transmission data to be multiplexed along a transmission interval.

Figure 8:
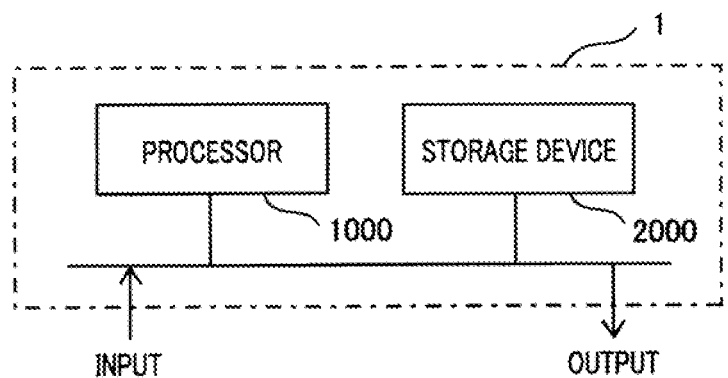
FIG. 8 is a block diagram representing an example of a hardware configuration of the electronic control apparatus according to Embodiment 1.

FIG. 8 is a block diagram representing an example of a hardware configuration of the electronic control apparatus according to Embodiment 1. As represented in FIG. 8, the electronic control apparatus 300 includes a processor 1000 and a storage device 2000. Although not illustrated, the storage device has a volatile storage device such as a random access memory and a nonvolatile auxiliary storage device such as a flash memory. Instead of the flash memory, an auxiliary storage device formed of a hard disk may be provided. The processor 1000 implements a program inputted from the storage device 2000. In this case, the program is inputted from the auxiliary storage device to the processor 1000 by way of the volatile storage device. It may be allowed that the processor 1000 outputs data such as a calculation result either to the volatile storage device in the storage device 2000 or to the auxiliary storage device by way of the volatile storage device.

The present disclosure is not limited to the electronic control apparatus according to foregoing Embodiment 1; Embodiment 1 can appropriately be modified or omitted.

INDUSTRIAL APPLICABILITY

The present disclosure can be applied to the field of an electronic control apparatus provided with an information output apparatus that outputs communication data having information and a control apparatus that controls a control subject, based on the information outputted from the information output apparatus.

DESCRIPTION OF REFERENCE NUMERALS

100: information output apparatus
101: control apparatus
102: information A
103: information B
104: information C
105: transmission counter
106: information multiplex apparatus
107: transmission circuit
108: transmission timer
109: reception circuit
110: information division apparatus
111: information A processing apparatus
112: information B processing apparatus
113: information C processing apparatus
115: first transmission interval information
116: second transmission interval information
117: information A buffer
118: information B buffer
119: information C buffer
120: information A transmission data
121: information B transmission data
122: information C transmission data
124: information A reception data
125: information B reception data
126: information C reception data
128: received transmission counter
200: transmission data
210: reception data
300: electronic control apparatus
1000: processor
2000: storage device

The invention claimed is:

1. An electronic control apparatus comprising:
two or more information items to be updated at respective predetermined timings;
an information multiplex apparatus that multiplexes the two or more information items;
a transmission circuit that periodically transmits multiplexed transmission data outputted by the information multiplex apparatus; and
a transmission counter that counts the number of transmissions transmitted by the transmission circuit,
wherein based on a count value held by the transmission counter, the information multiplex apparatus forms the multiplexed transmission data by selecting or dividing at least part of each of the two or more information items, based on respective sizes of the two or more information items, a counter period of the transmission counter, and a transmission margin degree,
wherein the information multiplex apparatus adds error detection information to each of the transmission data items,
wherein the electronic control apparatus further comprises:
a reception circuit that receives the multiplexed transmission data transmitted by the transmission circuit;
an information division apparatus that divides reception data received by the reception circuit;
two or more information buffers in which the divided reception data items are stored; and
two or more information processing apparatuses that obtain the two or more information buffers in two or more different periods,
wherein the information multiplex apparatus multiplexes the two or more information items in such a way that each of all reception data items stored in the two or more information buffers is updated in an interval shorter than a period in which the two or more information processing apparatuses obtain the respective stored reception data items from the two or more information buffers, and
wherein when the information division apparatus receives the error detection information, the information multiplex apparatus holds reception data stored in the information buffer.

2. The electronic control apparatus according to claim 1, wherein the information multiplex apparatus adds the count value of the transmission counter to the transmission data.

3. The electronic control apparatus according to claim 2, wherein when dividing data received by the reception circuit, the information division apparatus utilizes the count value of the transmission counter.

4. The electronic control apparatus according to claim 1, wherein respective priority degrees are provided to the two or more information items, and a frequency of transmitting data having a priority degree higher than that of another information is made larger than a frequency of transmitting said another information.

5. The electronic control apparatus according to claim 4, wherein when dividing data received by the reception circuit, the information division apparatus utilizes the count value of the transmission counter.

6. The electronic control apparatus according to claim 4, wherein the priority degree is included in the count value of the transmission counter.

7. The electronic control apparatus according to claim 6, wherein when dividing data received by the reception circuit, the information division apparatus utilizes the count value of the transmission counter.

8. The electronic control apparatus according to claim 1, wherein a whole size of the transmission data outputted by the information multiplex apparatus is constant.

9. The electronic control apparatus according to claim 8, wherein when dividing data received by the reception circuit, the information division apparatus utilizes the count value of the transmission counter.

10. An electronic control apparatus comprising:
two or more information items to be updated at respective predetermined timings;
an information multiplex apparatus that multiplexes the two or more information items;
a transmission circuit that periodically transmits multiplexed transmission data outputted by the information multiplex apparatus; and
a transmission counter that counts the number of transmissions transmitted by the transmission circuit,
wherein based on a count value held by the transmission counter, the information multiplex apparatus forms the multiplexed transmission data by selecting or dividing at least part of each of the two or more information items, based on respective sizes of the two or more information items, a counter period of the transmission counter, and a transmission margin degree,
wherein the electronic control apparatus further comprises:
a reception circuit that receives the multiplexed transmission data transmitted by the transmission circuit;
an information division apparatus that divides reception data received by the reception circuit;
two or more information buffers in which the divided reception data items are stored; and
two or more information processing apparatuses that obtain the two or more information buffers in two or more different periods, and
wherein the information multiplex apparatus multiplexes the two or more information items in such a way that each of all reception data items stored in the two or more information buffers is updated in an interval shorter than a period in which the two or more information processing apparatuses obtain the respective stored reception data items from the two or more information buffers.

11. The electronic control apparatus according to claim 10, wherein when dividing data received by the reception circuit, the information division apparatus utilizos the count value of the transmission counter.

* * * * *